US006069570A

United States Patent [19]
Herring

[11] Patent Number: 6,069,570
[45] Date of Patent: *May 30, 2000

[54] ASSET LOCATION SYSTEM

[75] Inventor: Russell M. Herring, San Antonio, Tex.

[73] Assignee: ATX Technologies, Inc., San Antonio, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/932,878

[22] Filed: Sep. 18, 1997

Related U.S. Application Data

[60] Provisional application No. 60/026,408, Sep. 20, 1996.
[51] Int. Cl.⁷ ......................................................... G08B 5/22
[52] U.S. Cl. ................................ 340/825.49; 340/825.47; 342/457
[58] Field of Search .......................... 340/825.44, 825.47, 340/825.49, 988; 342/457, 450, 357.09, 357.14

[56] References Cited

U.S. PATENT DOCUMENTS

| | | | |
|---|---|---|---|
| 4,742,357 | 5/1988 | Rackley | 342/457 |
| 5,355,511 | 10/1994 | Hatano et al. | 455/11.1 |
| 5,418,537 | 5/1995 | Bird | 342/357 |
| 5,506,587 | 4/1996 | Lans | 342/357.09 |
| 5,515,043 | 5/1996 | Berard et al. | 340/988 |

*Primary Examiner*—Michael Tokar
*Assistant Examiner*—Joan B. Jeanglaude
*Attorney, Agent, or Firm*—Jenkens & Gilchrist, A Professional Corporation

[57] ABSTRACT

An asset location system includes a pager, a control processor, a GPS receiver and a cell phone. During normal operation, the equipment on board the tracked asset is in a low power or sleep mode. Upon receiving a location quaere from a call center, a signal or control processor is powered up. If location information is to be obtained from a particular asset, a GPS receiver obtains latitude and longitude information. This latitude and longitude information is put in a transmittable form by a modem. A cellular telephone module then transmits this information to a remote monitoring or response center. If desired, data reporting on asset condition may also be sent the remote monitoring or response center along with the location information.

17 Claims, 1 Drawing Sheet

ASSET LOCATION SYSTEM

This application claims the benefit of U.S. Provisional Patent Application, Ser. No. 60/026,408 filed Sep. 20, 1996.

FIELD OF THE INVENTION

The present invention pertains to a low cost, low power communication system; more particularly the present invention pertains to a non-voice communication system for determining the location or states of an asset or a class of assets in a larger array of assets such as a tractor trailer, a container, construction equipment, P & D trucks, service vehicles, buses, financed vehicles which can be repossessed, etc.

BACKGROUND

The location of any particular transportable or movable asset in an array of dispersed transportable or movable assets is extremely important to its owner or the entity responsible for the control and maintenance of the assets. Many asset location systems utilize a sophisticated communications regimen in which the asset automatically or periodically reports its location at regular intervals to a central location. Such systems typically have high power requirements and cannot be effectively used in remote areas or in situations where the asset must remain unattended for long periods of time.

Therefore a need remains in the art for a low power, reliable communications system that will provide the location of a transportable or movable asset when needed.

SUMMARY

A lower power, lower cost system for reliably reporting the location single or identified class of a transportable or movable asset within a larger array of assets to a monitoring or response center includes a pager, a signal or states control processor, a GPS receiver and a cell phone. Specifically, when the need arises to determine the location of a particular transportable or movable asset or an identified class of assets within a larger array of assets, a wide area pager call is made by a call center to all pagers located on all assets whose location is tracked by the system of the present invention. All pagers mounted to all called assets pass the incoming call to the signal or control processor. If the incoming call is electronically matched to a particular called asset, the signal or control processor on that particular asset energizes the co-located GPS receiver. If the incoming call is not matched to a particular called asset, the system on that called asset returns to its lower power or sleep mode. The co-located GPS receiver then provides a signal containing information describing the physical location of the asset to a modem. In addition, asset condition or status information may be provided to the modem. The location and/or operational status information is then transmitted from the modem by a cellular telephone to a monitoring or response center. Once the transmission of data is complete, the system returns to its lower power or sleep mode.

BRIEF DESCRIPTION OF THE DRAWING FIGURE

A better understanding of the Asset Location System of the present invention may be had by reference to the drawing figure wherein:

FIG. 1 is a schematic illustration of the operation of the present invention.

DESCRIPTION OF THE EMBODIMENTS

Figure 1:
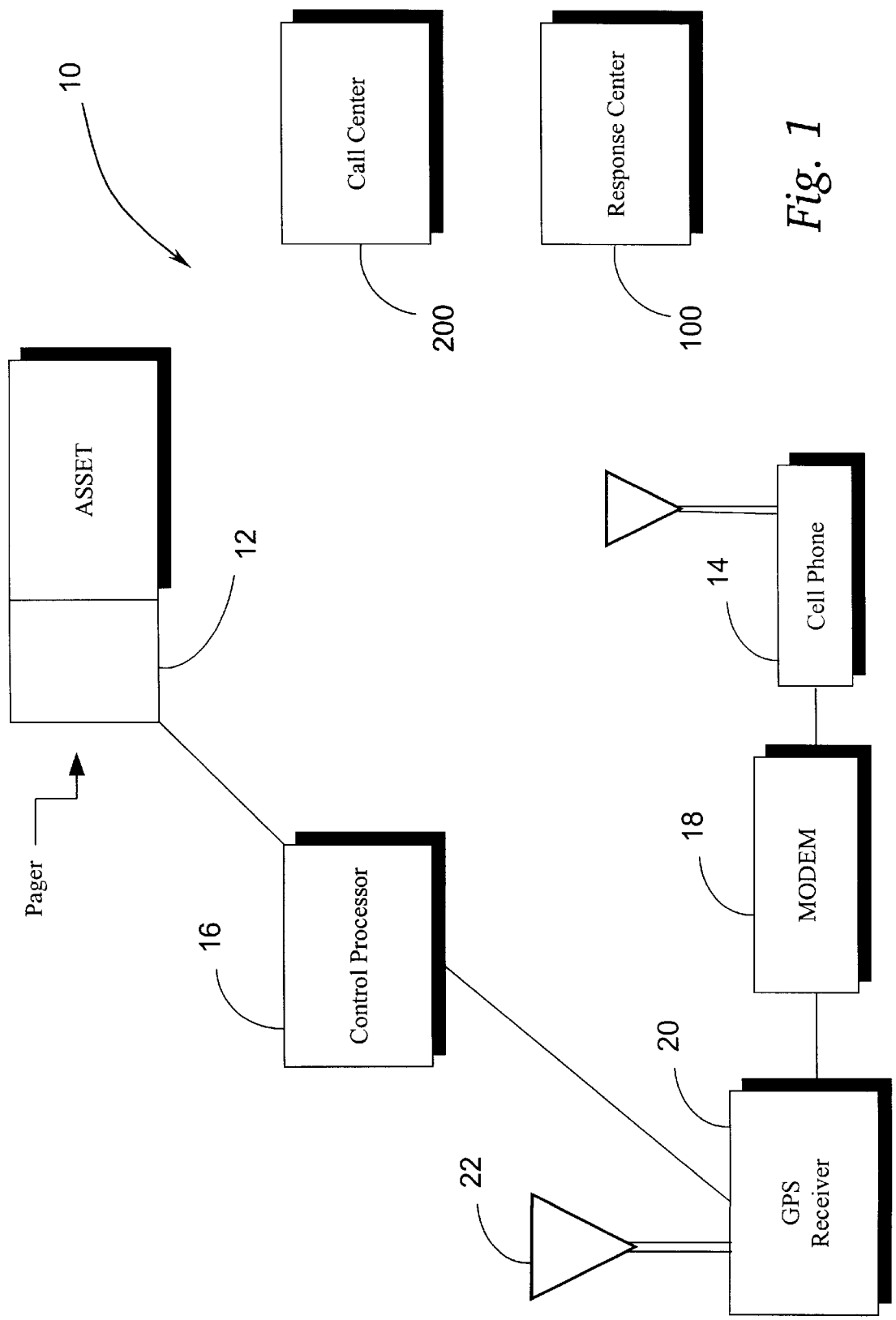

The asset location system 10 of the present invention spends most of its time in a low power or sleep mode. In this low power or sleep mode, the asset location system 10 draws very little current from a power source such as a battery or photovoltaic cell (not shown). When a particular transportable or movable asset is to be located, a call is sent out to all assets; but only the asset location system onboard the particular asset is or group of assets awakened or activated. Upon activation the asset location or operational states system 10 on board the particular identified asset or group of assets sends physical location data back to a remote monitoring or response center 100.

As shown in FIG. 1, the asset location system 10 of the present invention includes a pager 12 which is mounted on the asset to be tracked. While a pager 12 is used in the preferred embodiment, those of ordinary skill in the art will understand that other types of signal receiving means may also be used.

A cellular telephone module 14 is provided for communication with the remote monitoring or response center 100. Information such as GPS location and/or asset condition status data to be sent by the cellular telephone module 14 is delivered to the modem 18. The modem 18 conditions the digital GPS location and/or asset condition status data so that it may be sent over the cellular wireless data transmission communications link. While a cellular telephone communications link is used in the preferred embodiment, it will be understood that other types of data transmission means may also be used. The GPS receiver 20 provides data representative of location information from signals received from orbiting GPS satellites (not shown) through the co-located antenna 22. The control or signal processor 16 determines if the location quaere from the call center 200 is for a particular asset. If the location quaere relates to a particular asset, then the control or signal processor 16 on that particular asset wakes up or activates the GPS receiver 20 which in turn generates a location signal for transmission by the cellular telephone module 14 to the remote monitoring or response center 100.

Operation

When a particular asset or class of assets is to be located, a call is placed to a single pager number by a call center 200. The pager service can be local or nationwide. The pager call consists of a single phone number expressed as a numerical or alpha-numerical message that is sent out to all pagers located on all assets within the system. That groups of pagers affixed to a predetermined category of assets or bearing a matching phone number in the memory of the control or signal processor 16 will respond to the outgoing pager call.

Every asset located-pager 12 detects the incoming numerical message or alpha-numerical and wakes up its associated signal or control processor 16. The signal or control processor 16 analyzes the incoming numerical message and determines whether or not the message relates to the particular asset on which the location system is attached. Generally, this is accomplished by matching the received numerical or alpha-numerical sequence to a numerical or alpha-numerical sequence resident in the memory of the control or signal processor 16. If there is no match, the control or signal processor 16 goes back to sleep or back to its low power mode. If the numerical or alpha-numerical message does relate to the particular asset to which the asset location system 10 is affixed, then the control or signal processor 16 wakes up or activates the GPS receiver 20 to obtain data representing the location of the asset to which the GPS receiver 20 is attached. Since this will most likely be a cold start for the GPS receiver 20, a few moments may be required for the GPS receiver 20 to acquire data from the orbiting GPS satellites and convert these data signals into usable information.

After the GPS location information is acquired by the GPS receiver 20, the modem 18 and the cellular telephone module 14 are powered up and a call is placed to the appropriate monitoring or response center 100. To assure a proper or secure communication link with the monitoring and response center 100 a proprietary communication protocol may be used. When the communication link is established between the cellular telephone 14 and the remote monitoring or response center 100, the location information data and/or asset status data are transmitted to the remote monitoring or response center 100. At the remote monitoring or response center 100, the information describing the location of the asset may be displayed on a map or relayed by the response center 100 to another location as latitude and longitude data. After the remote monitoring or response center 100 has received the transmitted information, the communication link is terminated and the asset location system 10 goes back to sleep or returns to a low power mode of operation.

If no location information can be acquired by the GPS receiver 20 within a preset period of time following the receipt of the page, then the system on board the asset places a cellular telephone call to the remote monitoring or response center 100 to report that fact. This call also tells the remote monitoring or response center 100 that the unit is still functional even if conditions conspire to prevent a GPS location fix from being realized.

If the asset location system 10 of the present invention is wired to a large battery, then there is no need for a photovoltaic cell to generate electricity for the asset location system 10 if that battery is charged regularly. However, with a photovoltaic cell, the asset location system 10 can operate without any external source of power as long as sunlight falls upon the photovoltaic cell for a nominal amount of time each day. A trickle charge could also be provided for photovoltaic powered systems where sunlight is not available on a regular basis.

To reduce costs, no two cellular telephones in an array of locatable assets would be powered up at any one time; specifically, all cellular telephones in the asset location system 10 of the present invention could be clones of one another, but only one would be powered up at any one time. In this way, only one cellular telephone monthly charge could be encountered.

While the asset location system of the present invention has been described by reference to its preferred embodiment, it will be understood by those of ordinary skill in the art that numerous other embodiments of the present invention will become apparent to those of ordinary skill in the art once having been made aware of the foregoing disclosure. Such other embodiments shall fall within the scope and meaning of the appended claims.

I claim:

1. A system for reporting the location or a status or condition of a designated single or designated class of movable or transportable assets within a group of assets to a response center, said system comprising:

a means for receiving a numerical or alpha-numerical signal, said means for receiving a numerical or alpha-numerical signal being affixed to each movable or transportable asset within the group of assets;

a signal or control processor substantially co-located with said means for receiving a numerical or alpha-numerical signal, said signal or control processor being activated whenever a signal is received from said means for receiving a numerical or alpha-numerical signal;

a means for providing a signal representative of physical location, status or condition of the movable or transportable asset within the group of assets being substantially co-located with said signal or control processor, said means for providing a signal representative of physical location or status of the movable or transportable asset within the group of assets being activated only by a predetermined activation signal received by at least one movable or transportable asset from said signal or control processor;

said means for providing a signal representative of physical location, status or condition of the movable or transportable asset within the group of assets being constructed and arranged to provide a signal representative of the physical location, status or condition of the designated single or designated class of movable or transportable assets; and a means for transmitting a data signal substantially co-located with said means for providing a signal representative of physical location, status or condition of the movable or transportable asset within the group of assets, said means for transmitting a data signal being constructed and arranged to transmit location or status information data received from said means for providing a signal representative of physical location or status to the response center;

means for de-activating said means for providing a signal once said data has been transmitted.

2. The system as defined in claim 1 wherein said means for receiving a numerical or alpha-numerical signal is a pager.

3. The system as defined in claim 1 wherein said means for transmitting a data signal is a cellular phone module.

4. The system as defined in claim 1 wherein said means for providing a signal representative of physical location is a GPS receiver.

5. The system as defined in claim 1 further including a photovoltaic cell for providing electrical power to the other components in the system.

6. The system as defined in claim 1 wherein said signal or control processor further includes means for matching said received signal with a predetermined signal.

7. The system as defined in claim 6 further including means to actuate said means for providing a signal representative of physical location and said means for transmitting a data signal when said received signal matches said predetermined signal.

8. The system as defined in claim 1 wherein the normal operation of said system is in a low power or sleep mode.

9. The system as defined in claim 8 further including means for restoring said system to a low power or sleep mode following the transmission of a signal by said means for transmitting a data signal.

10. A method for locating or determining a status or condition of a particular asset or class of assets within an array of assets, said method comprising the steps of:

initiating a pager call by a call center to all of the particular assets in the array of assets;

receiving said pager call by an individual pager located on all assets in the array of assets;

activating a signal or control processor on all particular assets in the array of assets upon the receipt of said pager call;

comparing said pager call with a predetermined pager call stored within said signal or control processor on each particular asset;

activating a GPS receiver or status or condition sensor on each particular asset if said pager call matches said predetermined pager call stored within said signal or control processor on each particular asset;

obtaining location data from said GPS receiver or status or condition data from at least one sensor on each particular asset;

transmitting said location, status, or condition data to a modem; and transmitting said location, status, or condition data from said modem to the response or monitoring center by a cellular telephone;

deactivating said GPS receiver or status or condition sensor once said location, status, or condition data has been transmitted.

11. The method as defined in claim 10 further including the step of reporting to the response or monitoring center that no location data is available if no location data is obtained from the GPS receiver.

12. The method as defined in claim 10 wherein said signal or control processor is placed in a lower power or sleep mode if said pager call does not match said predetermined pager call stored within said signal or control processor.

13. The method as defined in claim 10 wherein a communication protocol is used to establish a communication link between said cellular telephone and said response or monitoring center before said location data is transmitted.

14. The method as defined in claim 10 wherein said signal or control processor, said GPS receiver, said modem and said cellular telephone are placed in a low power or sleep mode following the transmission of said location data to said monitoring or response center.

15. The method as defined in claim 10 wherein only one cellular telephone in said array of assets is powered up at any one time.

16. The method as defined in claim 10 further including the step of displaying the location of the asset on a map.

17. The method as defined in claim 10 further including the step of relaying said location data from said monitoring or response center to another location.

* * * * *